(No Model.)

R. M. EASTMAN.
SHOULDER PAD FOR GARMENTS.

No. 374,120.    Patented Nov. 29, 1887.

Witnesses.
Ralph W. Hopper.
Henry H. Letteney

Inventor.
Rufus M. Eastman
per Eugene Humphrey his atty

UNITED STATES PATENT OFFICE.

RUFUS M. EASTMAN, OF BOSTON, ASSIGNOR OF ONE-HALF TO FRANKLIN M. UPHAM, OF SOMERVILLE, MASSACHUSETTS.

SHOULDER-PAD FOR GARMENTS.

SPECIFICATION forming part of Letters Patent No. 374,120, dated November 29, 1887.

Application filed January 20, 1887. Serial No. 224,868. (No model.)

*To all whom it may concern:*

Be it known that I, RUFUS M. EASTMAN, of Boston, in the county of Suffolk and State of Massachusetts, have invented a new and useful Molded Shoulder-Stay for Garments, which will, in connection with the accompanying drawings, be hereinafter fully described, and specifically defined in the appended claim.

My invention relates to an article designed to support the shoulders of garments and give to them the requisite smooth and symmetrical form; and it consists in a light elastic stiffening or stay molded into the proper shape to be inserted in the shoulder of a garment, as hereinafter more fully and particularly set forth and claimed.

Figure 1:
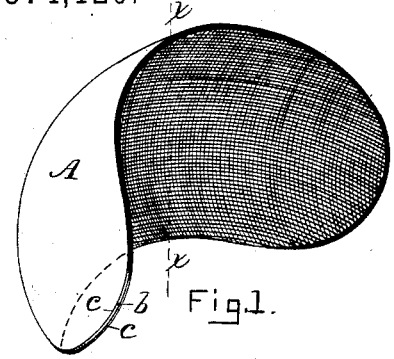
Figure 2:
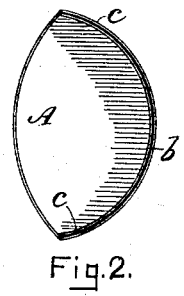
Figure 3:
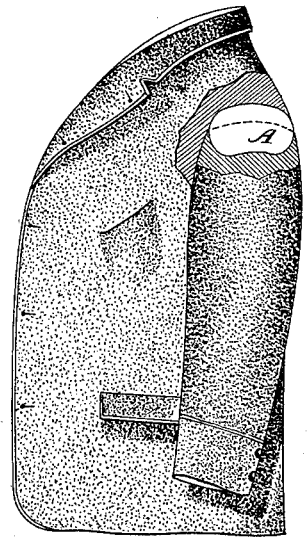
Figure 4:
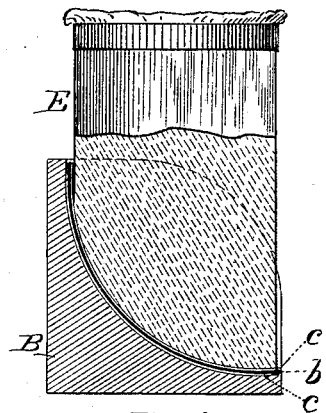
Figure 5:
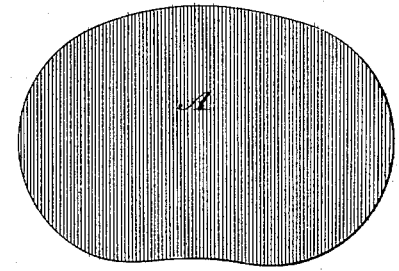

In the accompanying drawings, Figure 1 is a perspective view of a molded stay embodying my invention. Fig. 2 is a cross-section of the same taken as on line $x\ x$, Fig. 1, and as viewed from the right of said line. Fig. 3 is a view showing the application of my invention to a garment in which is represented a coat having a portion of the outer cloth removed from the shoulder, so as to disclose the molded stay in its proper place between the outer cloth and the lining, as when in practical use. Fig. 4 is a side elevation, partly in section, of a simple mold and die by means of which the proper shape may be given to said shoulder-stay, as hereinafter described. Fig. 5 represents in outline the pieces of which the stay is composed, as they are cut out before being molded together into the form shown in Fig. 1.

The stay A, Fig. 1, which illustrates my invention in its completed form, is composed of two outer layers or thicknesses, $c\ c$, which may be of canvas, hair-cloth, or any other suitable material, and an interposed layer, $b$, which may be of thin rubber, or other analogous material susceptible of being rendered adhesive by the application of heat and thus made to serve the purpose hereinafter described.

In constructing the stay A, which, when finished, is of concavo-convex form in two directions at right angles to each other, I cut out two pieces of cloth, preferably canvas or hair-cloth, of the required shape and size, and one piece, preferably, of thin rubber from the common commercial sheets of this goods; and I next put the pieces of cloth and rubber together, with the rubber in the middle and their edges even, and place them in a metallic mold, B, heated to the proper degree to partially melt the rubber and render it adhesive, and formed to give the proper shape to the combined pieces when pressed therein. I next force the corresponding die, E, down upon the said pieces so placed in the mold with sufficient power to press them into the desired concavo-convex form. The heat required to render the rubber adhesive is not necessarily sufficient to injure the outer layers of cloth in the short time they are required to remain in the mold. When removed therefrom, the plastic rubber cools readily, retaining the form of the mold, and adheres firmly to the layers of cloth, thus holding them to the same form and thereby constituting an elastic combination, and one which will retain its shape unaffected by moisture, which latter quality is a consideration of importance in an article of this kind. The new article thus produced, constituting a light, elastic, and desirable shoulder-stay, may be supplied to clothing-manufacturers and tailors ready made, of various sizes, at small cost, and with great convenience and utility; and by their use the shoulders of garments, of whatever grade or quality, will be given an unusually permanent, symmetrical, and stylish form.

It is obvious that the means employed for molding these stays may be greatly varied; and as I make no claim to any such devices I have only deemed it necessary to show one of the most simple means for producing the desired form.

I claim—

A shoulder-stay for garments of concavo-convex form in two directions at right angles to each other, the said stay consisting of layers of cloth and an intermediate layer of rubber or analogous adherent and water-proof material, substantially as set forth.

RUFUS M. EASTMAN.

Witnesses:
HENRY H. LETTENEY,
CHS. K. ATWOOD.